US012780309B2

(12) United States Patent
Plettner et al.

(10) Patent No.: US 12,780,309 B2
(45) Date of Patent: Nov. 3, 2026

(54) STEERING ASSEMBLY, VEHICLE AND METHOD FOR DETERMINING A STEERING TORQUE OF A STEERING SYSTEM

(71) Applicant: Schaeffler Technologies AG & Co. KG, Herzogenaurach (DE)

(72) Inventors: Georg Plettner, Herzogenaurach (DE); Fabian Ruh, Erlangen (DE); Dominik Reif, Großenseebach (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 525 days.

(21) Appl. No.: 18/265,671

(22) PCT Filed: Nov. 4, 2021

(86) PCT No.: PCT/DE2021/100880
§ 371 (c)(1),
(2) Date: Jun. 6, 2023

(87) PCT Pub. No.: WO2022/127968
PCT Pub. Date: Jun. 23, 2022

(65) Prior Publication Data

US 2024/0025478 A1 Jan. 25, 2024

(30) Foreign Application Priority Data

Dec. 15, 2020 (DE) ..................... 10 2020 133 576.8

(51) Int. Cl.
*B62D 15/02* (2006.01)
*B62D 5/04* (2006.01)
(Continued)

(52) U.S. Cl.
CPC ....... *B62D 15/0215* (2013.01); *B62D 5/0415* (2013.01); *B62D 6/10* (2013.01); *G01L 5/221* (2013.01)

(58) Field of Classification Search
CPC .... B62D 15/0215; B62D 5/0415; B62D 6/10; B62D 1/16; B62D 15/021; G01L 5/221
See application file for complete search history.

(56) References Cited

U.S. PATENT DOCUMENTS 6,575,263 B2 * 6/2003 Hjelsand .............. B62D 5/0832 180/444
6,651,999 B1 * 11/2003 Fischer .................. B62D 15/02 701/41
(Continued)

FOREIGN PATENT DOCUMENTS

DE 19912169 A1 7/2000
DE 19936263 A1 2/2001
(Continued)

OTHER PUBLICATIONS

Source: Germany Patent and Trademark Office, Office Action dated Aug. 22, 2025, for priority Germany Patent Application 10 2020 133 576.8.
(Continued)

*Primary Examiner* — Freddie Kirkland, III

(57) ABSTRACT

The disclosure relates to a steering assembly for a drive-by-wire steering system of a vehicle having an input means for inputting a steering command, a steering shaft with a first region and a second region longitudinally spaced apart from the first region, and a sensor system for detecting a steering angle and/or a steering torque on the steering shaft. The sensor system comprises a first angular-position sensor and a second angular-position sensor. The first angular-position sensor is assigned to the first region and the second angular position sensor is assigned to the second region, so that it is possible to determine, by means of a difference of a first angle signal of the first angular-position sensor and a second
(Continued)

angle signal of the second angular-position sensor, the steering torque on the steering shaft on which the steering torque is acting.

20 Claims, 1 Drawing Sheet

(51) Int. Cl.
*B62D 6/10* (2006.01)
*G01L 5/22* (2006.01)

(56) References Cited

U.S. PATENT DOCUMENTS

| | | | | |
|---|---|---|---|---|
| 7,007,769 | B2 * | 3/2006 | Hara | B62D 5/003<br>180/444 |
| 7,207,411 | B2 * | 4/2007 | Duits | B62D 5/005<br>701/41 |
| 7,307,416 | B2 * | 12/2007 | Islam | G01D 5/145<br>324/207.2 |
| 7,664,584 | B2 * | 2/2010 | Chino | B62D 6/008<br>180/419 |
| 7,792,619 | B2 * | 9/2010 | Uryu | B62D 5/0484<br>180/443 |
| 10,005,491 | B2 * | 6/2018 | Farrelly | B62D 5/0463 |
| 10,745,046 | B2 * | 8/2020 | Hirate | B62D 15/0285 |
| 10,858,040 | B2 * | 12/2020 | Hulten | B62D 6/008 |
| 2002/0124663 | A1 * | 9/2002 | Tokumoto | G01L 3/104<br>73/862.333 |
| 2002/0157894 | A1 * | 10/2002 | Hjelsand | B62D 5/097<br>180/446 |
| 2004/0262071 | A1 * | 12/2004 | Duits | B66F 9/07568<br>180/402 |
| 2005/0000749 | A1 * | 1/2005 | Sato | F16D 41/086<br>180/402 |
| 2008/0007251 | A1 * | 1/2008 | Lee | B62D 15/0215<br>324/207.17 |
| 2016/0216168 | A1 * | 7/2016 | Itomi | G01L 5/221 |
| 2017/0144703 | A1 * | 5/2017 | Farrelly | B62D 5/0424 |
| 2017/0361867 | A1 * | 12/2017 | Lewis | B62D 5/006 |
| 2018/0201299 | A1 * | 7/2018 | Ashtari | F16H 1/06 |
| 2018/0304922 | A1 * | 10/2018 | Hirate | B62D 5/008 |
| 2023/0060008 | A1 * | 2/2023 | Williams | B62D 6/00 |
| 2024/0400129 | A1 * | 12/2024 | Gretchko | B62D 7/1509 |

FOREIGN PATENT DOCUMENTS

| | | | |
|---|---|---|---|
| DE | 19955475 | A1 | 6/2001 |
| DE | 10032180 | A1 | 1/2002 |
| DE | 602005000909 | T2 | 12/2007 |
| DE | 102008042213 | A1 | 3/2010 |
| DE | 102014208926 | A1 | 6/2015 |
| DE | 102018200590 | A1 | 3/2019 |
| DE | 102017130433 | A1 | 6/2019 |
| DE | 102018119268 | A1 | 2/2020 |
| DE | 102018123294 | A1 | 3/2020 |
| DE | 102019109886 | A1 | 10/2020 |
| EP | 3045885 | A1 | 7/2016 |

OTHER PUBLICATIONS

Source: Germany Patent and Trademark Office, Office Action dated Jun. 26, 2024, for priority Germany Patent Application 10 2020 133 576.8.

Source: Germany Patent and Trademark Office, Office Action dated Jul. 7, 2021, for priority Germany Patent Application 10 2020 133 576.8.

* cited by examiner

STEERING ASSEMBLY, VEHICLE AND METHOD FOR DETERMINING A STEERING TORQUE OF A STEERING SYSTEM

CROSS-REFERENCE TO RELATED APPLICATIONS

This application is the U.S. National Phase of PCT Application No. PCT/DE2021/100880 filed on Nov. 4, 2021, which claims priority to DE 10 2020 133 576.8 filed on Dec. 15, 2020, the entire disclosures of which are incorporated by reference herein.

TECHNICAL FIELD

The disclosure relates to a steering assembly, in particular for a drive-by-wire steering system of a vehicle as well as to a method for determining a steering torque of a steering system, in particular a drive-by-wire steering system.

BACKGROUND

For steering assemblies or steering systems, in particular those that use an electronic way to transmit the steering information, it is essential to safely determine not only the steering wheel angle but also the applied torque as a superposition of the driver's torque and a torque actively introduced by an actuator (so-called force feedback actuator).

DE 10 2018 119268 A1 deals with such a steer-by-wire steering system, in particular a method for adjusting a steering torque for controlling a feedback actuator of a steer-by-wire motor vehicle steering system. In this, a control for a force feedback feeling is improved and adapted.

The object of the disclosure is to improve the prior art.

The object is achieved by a steering assembly, in particular for a drive-by-wire steering system of a vehicle, according to that which is described herein.

In that the sensor system has a first angular-position sensor and a second angular-position sensor, wherein the first angular-position sensor is assigned to the first region and the second angular-position sensor is assigned to the second region, so that a specific steering torque of the steering shaft acted on by the steering torque can be determined by means of a difference between the first angle signal of the first angular-position sensor and a second angle signal of the second angular-position sensor. For example, angular-position sensors that are already available for determining a steering angle can also be used for safely determining a steering torque. A mechanical relationship between the steering torque and a corresponding torsion of the steering shaft is used as the basis for determining the steering torque using the first angular-position sensor and the second angular-position sensor.

The following terms should be explained at this point:

The term "steering assembly" can refer to any technical device which is suitable, for example, for steering or guiding a vehicle by means of a steering input on the steering assembly. For example, such a steering assembly is a steering assembly of a motor vehicle equipped with a steering column and a steering wheel.

The term "drive-by-wire steering system" describes a steering system in which steering signals are transmitted electronically, i.e. "by wire", from the steering assembly. For example, in such a steering system, a steering request or steering command is received from a steering wheel, electronically evaluated and sent to a servomotor by means of electrical signals, wherein the servomotor then adjusts steerable wheels of a vehicle.

In this context, a "steering torque" refers to the torque that occurs between an input means for an operator, for example, namely in particular an input means such as a steering wheel, and a device that further processes steering information. For example, this steering torque is generated between an input means, such as a steering wheel, and a drive or motor for simulating a steering force ("force feedback").

The term "input means" can refer to any means that can mechanically receive steering information or a steering request from an operator and then pass it on to the steering assembly. Such an input means is, for example, a steering wheel, joystick, control yoke, or other assembly acting in the same manner.

The term "steering command" in this context is the request of an operator or driver, which is input mechanically, for example with the hands, into the steering assembly using the input means.

A "steering shaft" can be, for example, an elongated shaft or also a so-called steering column or part of a steering column, wherein the steering shaft mechanically receives the steering commands input into the input means and converts them into a rotary movement.

The term "region" is, for example, a section or portion of the steering shaft such that, for example, a first region faces the input means and a second region faces away from the input means. A first region and a second region are spaced apart from one another in the longitudinal direction of the steering shaft such that, for example, a part of the steering shaft remains as a free region between the first region and the second region.

A "longitudinal direction" in this context is a direction along the longitudinal extension of the steering shaft, for example a longitudinal direction running along a center-of-gravity axis and/or axis of rotation of the steering shaft. In this regard, the longitudinal direction does not have to run along such an axis in a mathematically exact manner, but can deviate from it by up to −10° to +10°, for example. Specifications of angles here refer to a full angle of 360°.

The term "sensor system" can refer to any assembly of sensors, measuring transducers and/or corresponding electronic components that are suitable for safely determining and detecting a steering angle. For example, such a sensor system comprises a control chip and one or more sensors for acquiring an angle on the input means, steering shaft, or other part of the steering assembly.

The term "steering angle" refers to an angle which is input at the input means by an operator and which corresponds to a direct steering request or a direct steering command. In this regard, the steering angle which is input by the operator at the input means does not have to correspond to an angle, for example of a wheel deflection on the vehicle, which is converted by the steering assembly or a further mechanical steering system. In particular, a drive-by-wire system can be implemented here with a variable transmission ratio between the steering angle and steering deflection of the wheels.

The term "angular-position sensor" is any type of sensor system that is suitable for acquiring an angle, in particular the steering angle of the input means or the steering shaft, and converting it into corresponding electronic signals. Such an angular-position sensor is designed, for example, as a magnetic sensor, vane-cell sensor or also as an optical sensor, in particular as an incremental encoder.

A "first angular-position sensor" and a "second angular-position sensor" are assigned to the first region and the second region in such a way that the angular-position sensors can acquire an angle, in particular a steering angle, of the respective regions.

The term "assigned" describes here that the first angular-position sensor is arranged in the vicinity of or on the first region and/or the second angular-position sensor is arranged in the vicinity of or on the second region, so that, according to the measurement method, acquisition of a steering angle is possible in a safe manner. For example, a magnetic sensor, which is used as an angular-position sensor, can be arranged directly on the steering shaft in a region, while an optical sensor, on the other hand, can still safely acquire a signal despite being some distance away from the region of the steering shaft, provided that the optical line of sight between the sensor and the steering shaft is clear.

The steering torque is measured on the steering shaft acted on by the steering torque, for example in that the applied steering torque imposes a greater angle of rotation on a region of the steering shaft assigned to the input means than on a region of the steering shaft remote from the input means. In particular, the region of the steering shaft remote from the input means is braked or subjected to torque by a force feedback motor.

To make the steering assembly particularly safe, the first angular-position sensor is assigned to a first measuring channel and the second angular-position sensor is assigned to a second measuring channel, so that redundant acquisition of the steering angle by means of the first measuring channel and the second measuring channel is possible.

Such a "measuring channel" can, for example, be a separately arranged electronic channel within a measuring system in each case, so that in the event of failure of one of the measuring channels, at least the acquisition of the steering angle of the steering assembly is still possible by means of the second or further measuring channel. The same applies if one of the two angular-position sensors fails, so that even in this case there is still at least one safe signal regarding a steering angle of the steering assembly.

In one embodiment, the first angular-position sensor and the second angular-position sensor are electrically supplied separately from one another, in particular in a manner galvanically separated from one another.

By means of such galvanic separation, for example by supplying the first angular-position sensor and the second angular-position sensor via two separate electrical systems of a motor vehicle, at least one angular-position sensor can continue to safely supply information about a steering angle of the steering assembly, for example in the event of an electrical fault in an electrical supply system.

The term "galvanically separated" in this context describes any receptacle, assembly, or other provision for a sensor, circuit, or printed circuit board that prevents the flow of electrical current between respective components or reduces it below a measurable limit. Corresponding components can be separated from one another, for example, by means of electrically non-conductive components or intermediate elements. Furthermore, such a galvanically separated assembly also comprises an electrical supply from different electrical sources.

In order to be able to safely acquire a full rotation or a partial rotation of a full rotation of the steering assembly, in particular of the input means, the first angular-position sensor and/or the second angular-position sensor has/have a measuring range of 360°. Furthermore, such an angular-position sensor, in particular without the possibility of acquiring an angle larger than a full revolution, can be designed in a particularly simple and inexpensive manner.

In order to be able to design the steering assembly in a simple and inexpensive manner, the first angular-position sensor and/or the second angular-position sensor is/are a magnetic sensor or an optical sensor.

A "magnetic sensor" is a sensor which can ascertain a corresponding angle by means of magnetic systems. For example, such a magnetic sensor is a vane-cell sensor, a Hall sensor, or another sensor operating according to the magnetic principle.

The term "optical sensor" can refer to any sensor system that uses optical means to ascertain a corresponding angle. For example, such an optical sensor is a photoelectric sensor, a laser, or another optical element that scans, for example, an incremental disk or even a bar code.

In a further embodiment, the first angular-position sensor and/or the second angular-position sensor is/are a sensor bearing, so that the angular-position sensor receives the steering shaft in a mechanically rotatable manner. Such a sensor bearing is described, for example, in DE 10 2017 130 433 A1.

The term "sensor bearing" describes an assembly which has both a mechanical bearing, for example a deep groove ball bearing, as well as a measuring assembly for determining an angle. Such sensor bearings are known in various forms.

In a further aspect, the object is achieved by a vehicle, in particular a motor vehicle, having a steering assembly according to one of the above embodiments.

In such a vehicle, a corresponding steering torque can be determined safely and reliably. Furthermore, the redundant design of the steering assembly allows for it to be easily and reliably integrated into other vehicle systems in accordance with applicable safety standards. In addition, such a vehicle with such a steering assembly can be manufactured in a particularly flexible manner, since, for example, a steering assembly intended for installation is very compact and can therefore be mounted in a variable manner.

In a further aspect, the object is achieved by a method for determining a steering torque of a steering system, in particular a drive-by-wire steering system.

In such a method, a steering torque of a steering system can be determined easily and in particular by means of angular-position sensors of a corresponding steering system which are already available for redundant acquisition of a steering angle. From the difference between the first angular position and the second angular position of an angular-position sensor, such a steering torque can be safely determined by using a torsion of the steering shaft.

The term "angle signal" describes angle information, ascertained by means of an angular-position sensor and converted into electronic form, about the rotational position of an angular-position sensor relative to a zero angle, for example a zero position of the steering wheel.

A "difference angle" is the deviation of the first angular position from the second angular position, so that, for example, a corresponding torsion of the steering shaft results in a first angular position of 36° and a second angular position of 36.5°, meaning that a difference angle would be 0.5°.

The term "mathematical function" describes the direct relationship between the difference angle from the first angular position and the second angular position and the steering torque, which is given by a mechanical torsional stiffness of the steering shaft. This provides a clear and repeatable relationship between the difference angle and the steering torque, from which a steering torque can be reliably determined by means of the mathematical function mentioned.

A "mechanical torsional stiffness" of the steering shaft, which is also referred to as "torsional rigidity", is a characteristic relationship between a torque applied to the steering shaft and a corresponding torsion per corresponding length of the steering shaft. Such a torsional stiffness is specified, for example, as the product of the so-called shear modulus of the material of the steering shaft and a torsional moment of inertia resulting from the cross section of the steering shaft.

In one embodiment, a steering angle is determined, in particular redundantly, by means of the first angular-position sensor and the second angular-position sensor.

The first angular-position sensor and the second angular-position sensor acquire a steering angle in each case independently of one another, so that a corresponding steering angle can be determined at the same time as the steering torque. By acquiring the steering angle and determining it using the first angular-position sensor and the second angular-position sensor, a redundant signal for the steering angle can thus be generated.

BRIEF DESCRIPTION OF THE DRAWINGS

The disclosure is explained in more detail below using exemplary embodiments. In the drawings.

DETAILED DESCRIPTION

Figure 1:
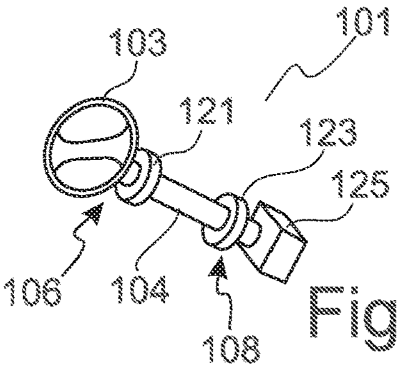
FIG. 1 shows a schematic representation of a steering system in an isometric view.
Figure 2:
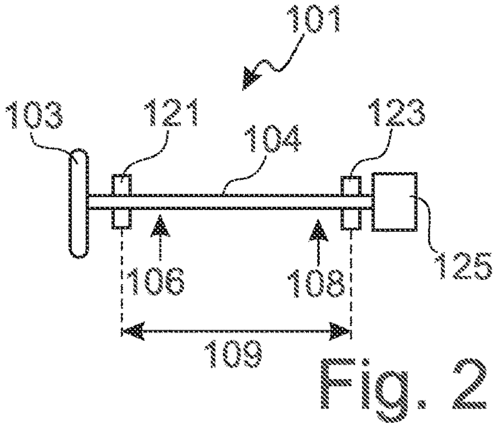
FIG. 2 shows a schematic representation of the steering system of FIG. 1 in a side view.
Figure 3:
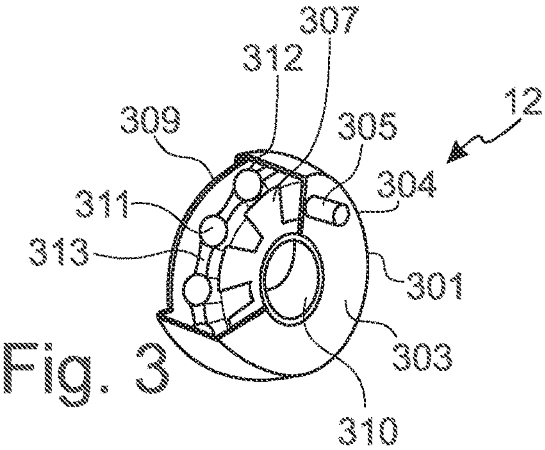
FIG. 3 shows a schematic representation of a sensor bearing for the steering system in an isometric partial section.
Figure 4:
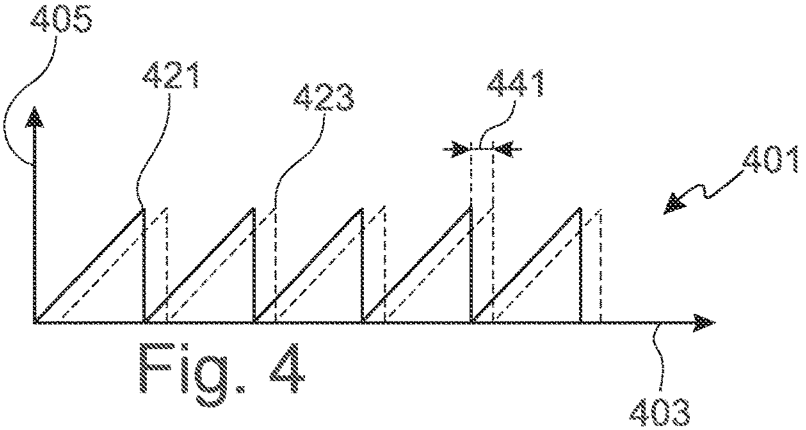
FIG. 4 shows a diagram with sensor signals from different sensor bearings during a steering movement.
Figure 5:
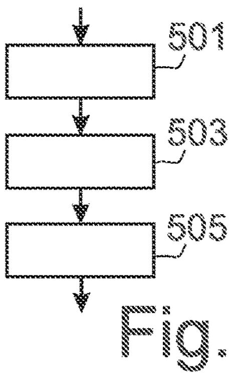
FIG. 5 shows a flow chart of a method for determining a steering torque.
Figure 6:
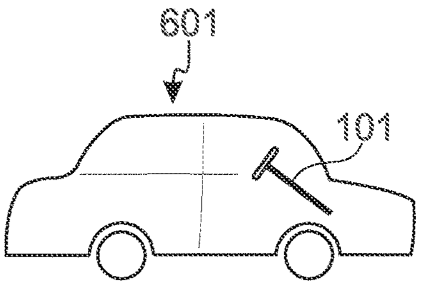
FIG. 6 shows a vehicle with a steering system.

A steering system 101 has a steering wheel 103 and a steering shaft 104 mechanically connected to the steering wheel. The steering shaft 104 is rotatably received in a sensor bearing 121 and a sensor bearing 123. In this regard, the sensor bearing 121 is arranged in an upper region 106 of the steering shaft 104 near the steering wheel 103. The sensor bearing 123 is arranged in a lower region 108 of the steering shaft 104.

A motor unit 125 adjoins the lower region 108 of the steering shaft 104, in which motor unit the steering shaft 104 is connected. By means of the motor unit 125, torque can be introduced in the steering shaft 104 and thus also in the steering wheel 103, so that steering forces can be simulated to an operator of the steering wheel 103.

The sensor bearing 121 as well as the sensor bearing 123 have both means for rotatably receiving the steering shaft 104 and means for measuring an angle of rotation. The structure of a sensor bearing is explained in more detail using the example of sensor bearing 121:

An impeller 307 is arranged within a housing 301 of the sensor bearing 121 and is mechanically connected to a rotatable inner ring 310. A magnetic sensor 305 is arranged within an end face 303 on an outer ring 304.

In this regard, the outer ring 304 is connected in a fixed manner to a surrounding assembly of the steering system 101, and the inner ring 310 non-rotatably receives the steering shaft 104.

By means of the magnetic sensor 305, the rotational movement of the impeller 307 can be detected in that a measurement signal of the magnetic sensor 305 is changed by the impeller 307. Thus, the magnetic sensor 305 can be used to detect a rotation of the inner ring 310 and thus of the steering shaft 104. The inner ring 310 is arranged on the steering shaft 104 in a non-rotatable manner. Analogously, an inner ring of the sensor bearing 123 is also arranged on the steering shaft 104 in a non-rotatable manner.

A sealing disc 309 is arranged opposite the impeller 307 and protects the sensor bearing 121 against the ingress of dust. Balls 311 are arranged in a groove 312 such that the inner ring 310 is rotatably guided relative to the outer ring 304 according to the principle of a deep groove ball bearing. In this regard, the balls 311 are held at an appropriate distance by a bearing cage 313. Grease contained in the sensor bearing 121 for lubricating the balls 311 is also protected and retained by the sealing disc 309. The sensor bearing 123 is constructed analogously, but with an impeller having a different number of blades compared to the impeller of the sensor bearing 121. This realizes the different angular resolution between the sensor bearing 121 and the sensor bearing 123.

Now, when an operator turns the steering wheel 103, for example in a vehicle 601, to give a steering input or steering command, the steering shaft 104 is twisted against a torque applied by the motor unit 125. Thus, the inner ring of the sensor bearing 121 and the sensor bearing 123 are twisted against one another to different extents. This results in a differential signal by means of which the steering torque on the steering wheel 103 can be determined in a control unit (not shown) by means of the torsional stiffness of the steering shaft 104. For this purpose, the torsional stiffness of the steering shaft 104 and a corresponding distance 109 of the first sensor bearing 121 with respect to the second sensor bearing 123 are taken into account.

A vehicle 601 is equipped with the steering system 101. This allows the steering torque to be determined while the vehicle 601 is in motion. In this regard, the steering system 101 is connected to further safety systems of the vehicle 601 (not shown). This also allows the steering angle to be ascertained redundantly by means of the sensor bearing 121 and the sensor bearing 123.

A diagram 401 shows corresponding signals of the sensor bearings 121 as well as 123 in an exemplary manner. The diagram 401 comprises a time axis 403 and a signal axis 405 (shown qualitatively). A sensor signal 421 corresponds to the signal of the magnetic sensor 305 within the sensor bearing 121, and a sensor signal 423 analogously corresponds to a signal of a magnetic sensor within the sensor bearing 123. The torsion of the steering shaft 104 and the resulting different angles on the sensor bearing 121 relative to the sensor bearing 123 then result in a time shift 414 between the respective sensor signals 421 and 423, which directly allows a conclusion to be drawn in regard to the currently applied steering torque on the steering wheel 103 and the steering shaft 104.

The sequence of a corresponding measurement method for determining a steering torque of a steering system is explained here once again:

Initially, a first angle signal, for example the angle signal of the sensor bearing 121, and a second angle signal, for example the angle signal of the sensor bearing 123, are measured 501, so that a first angular position and a second angular position are provided. Afterwards, a difference is ascertained 503 from these angle signals or angular positions, so that a difference angle can be ascertained. The steering torque is then determined 505 by means of a mathematical relationship between the ascertained difference angle and the length of the distance 109 as well as the stiffness of the steering shaft 104, so that the steering torque is thereby determined. In parallel, the steering angle of the steering system 101 is acquired redundantly by means of the sensor bearing 121 and the sensor bearing 123.

LIST OF REFERENCE SYMBOLS

101 Steering system
103 Steering wheel
104 Steering shaft
106 Upper region
108 Lower region
109 Distance
121 Sensor bearing
123 Sensor bearing
125 Motor unit
301 Housing
303 End face
304 Outer ring
305 Magnetic sensor
307 Impeller
309 Sealing disc
310 Inner ring
311 Ball
312 Groove
313 Bearing cage
401 Diagram
403 Time axis
405 Signal axis
421 Sensor signal
423 Sensor signal
414 Time shift
501 Measuring
503 Ascertaining
505 Determining
601 Vehicle

The invention claimed is:

1. A steering assembly configured for a drive-by-wire steering system of a vehicle, the steering assembly comprising:

an input means configured for inputting a steering command, a steering shaft having a first region and a second region spaced apart from the first region in a longitudinal direction of the steering shaft, a portion of the steering shaft extending between the first region and the second region defines a torsion measuring section of the steering shaft having a mechanical torsional stiffness, a motor adjoined to the second region of the steering shaft and configured to introduce torque into the steering shaft, and a sensor system configured for detecting at least one of a steering angle or a steering torque on the steering shaft, the sensor system comprising:

a first angular-position sensor assigned to the first region, and a second angular-position sensor assigned to the second region, and wherein a difference of a first angle signal of the first angular-position sensor and a second angle signal of the second angular-position sensor determines a steering torque on the steering shaft based on torsional deformation of the torsion measuring section and the mechanical torsional stiffness of the torsion measuring section.

2. The steering assembly according to claim 1, wherein the first angular-position sensor is assigned to a first measuring channel and the second angular-position sensor is assigned to a second measuring channel, so that redundant acquisition of the steering angle via the first measuring channel and the second measuring channel is possible.

3. The steering assembly according to claim 1, wherein the first angular-position sensor and the second angular-position sensor are galvanically separated from each other.

4. The steering assembly according to claim 1, wherein at least one of the first angular-position sensor or the second angular-position sensor is configured as a magnetic sensor.

5. The steering assembly according to claim 1, wherein at least one of the first angular-position sensor or the second angular-position sensor is configured as a sensor bearing, so that the sensor bearing receives the steering shaft in a mechanically rotatable manner.

6. A motor vehicle having a steering assembly according to claim 1.

7. The steering assembly according to claim 1, wherein:

the first angular-position sensor is arranged on the first region of the steering shaft, and the second angular-position sensor is arranged on the second region of the steering shaft.

8. The steering assembly according to claim 1, wherein at least one of the first angular-position sensor or the second angular-position sensor is configured as an optical sensor.

9. The steering assembly according to claim 1, wherein at least one of the first angular-position sensor or the second angular-position sensor is configured as a sensor bearing, and an inner ring of the sensor bearing is non-rotatably attached to the steering shaft.

10. The steering assembly according to claim 9, wherein the sensor bearing further comprises:

an impeller configured to rotate together with the inner ring, and a magnetic sensor configured to detect a rotation of the impeller.

11. The steering assembly according to claim 1, wherein:

the first angular-position sensor is configured as a first sensor bearing having a first impeller with a first number of blades, the second angular-position sensor is configured as a second sensor bearing having a second impeller with a second number of blades different than the first number of blades.

12. The steering assembly according to claim 1, wherein:

the first region and the second region are regions of a same steering shaft that is mechanically connected to the input means and to the motor, and the torsion measuring section is defined by a portion of the same steering shaft extending between the first region and the second region.

13. A method for determining a steering torque of a drive-by-wire steering system of a vehicle, wherein the drive-by-wire steering system comprises a steering shaft having a first region and a second region, an input means configured for operating the drive-by-wire steering system, a first angular-position sensor assigned to the first region, and a second angular-position sensor assigned to the second region for detecting an angle signal on the steering shaft, wherein a portion of the steering shaft extending between the first region and the second region defines a torsion measuring section of the steering shaft having a mechanical torsional stiffness, and wherein a motor is adjoined to the second region of the steering shaft and configured to introduce torque into the steering shaft, the method comprising:

measuring a first angle of the first region of the steering shaft via the first angular-position sensor and a second angle of the second region of the steering shaft via the second angular-position sensor, ascertaining a difference between the first angle and the second angle via a controller so that a difference angle is provided, determining the steering torque of the steering shaft via the controller and a mathematical function between the difference angle and the steering torque, the mathematical function corresponding to the mechanical torsional stiffness of the steering shaft.

14. The method according to claim 13, wherein a redundant steering angle is determined via the first angular-position sensor and the second angular-position sensor.

15. The method according to claim 13, wherein:

the first region and the second region are regions of a same steering shaft that is mechanically connected to the input means and to the motor, and the torsion measuring section is defined by a portion of the same steering shaft extending between the first region and the second region.

16. A method for determining a steering torque of a drive-by-wire steering system of a vehicle, the method comprising:

measuring a first angle of a first region of a steering shaft via a first angular-position sensor, and a second angle of a second region of the steering shaft via a second angular-position sensor, wherein:

the first region is longitudinally spaced from the second region, the first region and the second region are regions of a same steering shaft that is mechanically connected to an input means and to a motor, a portion of the same steering shaft extending between the first region and the second region defines a torsion measuring section of the same steering shaft having a mechanical torsional stiffness, and the motor is adjoined to the second region of the same steering shaft and is configured to introduce torque into the same steering shaft, determining a difference between the first angle and the second angle via a controller so that a difference angle is provided, and determining the steering torque of the same steering shaft via the controller and a mathematical function relating the difference angle to the steering torque, wherein the mathematical function corresponds to the mechanical torsional stiffness of the torsion measuring section of the same steering shaft.

17. The method according to claim 16, wherein the mathematical function corresponds to a mechanical torsional stiffness of the steering shaft.

18. The method according to claim 16, wherein the first angle is measured at an upper region of the steering shaft via the first angular-position sensor and the second angle is measured at a lower region of the steering shaft via the second angular-position sensor.

19. The method according to claim 16, wherein at least one of the first angular-position sensor or the second angular-position sensor is configured as a sensor bearing attached to the steering shaft.

20. The method according to claim 19, wherein the sensor bearing further comprises:

an impeller configured to rotate together with the steering shaft, and a magnetic sensor configured to detect a rotation of the impeller.

* * * * *